Aug. 6, 1935.　　C. F. HIRSHFELD　　2,010,668
TIRE FOR RAIL VEHICLES
Filed Sept. 25, 1933　　2 Sheets-Sheet 1
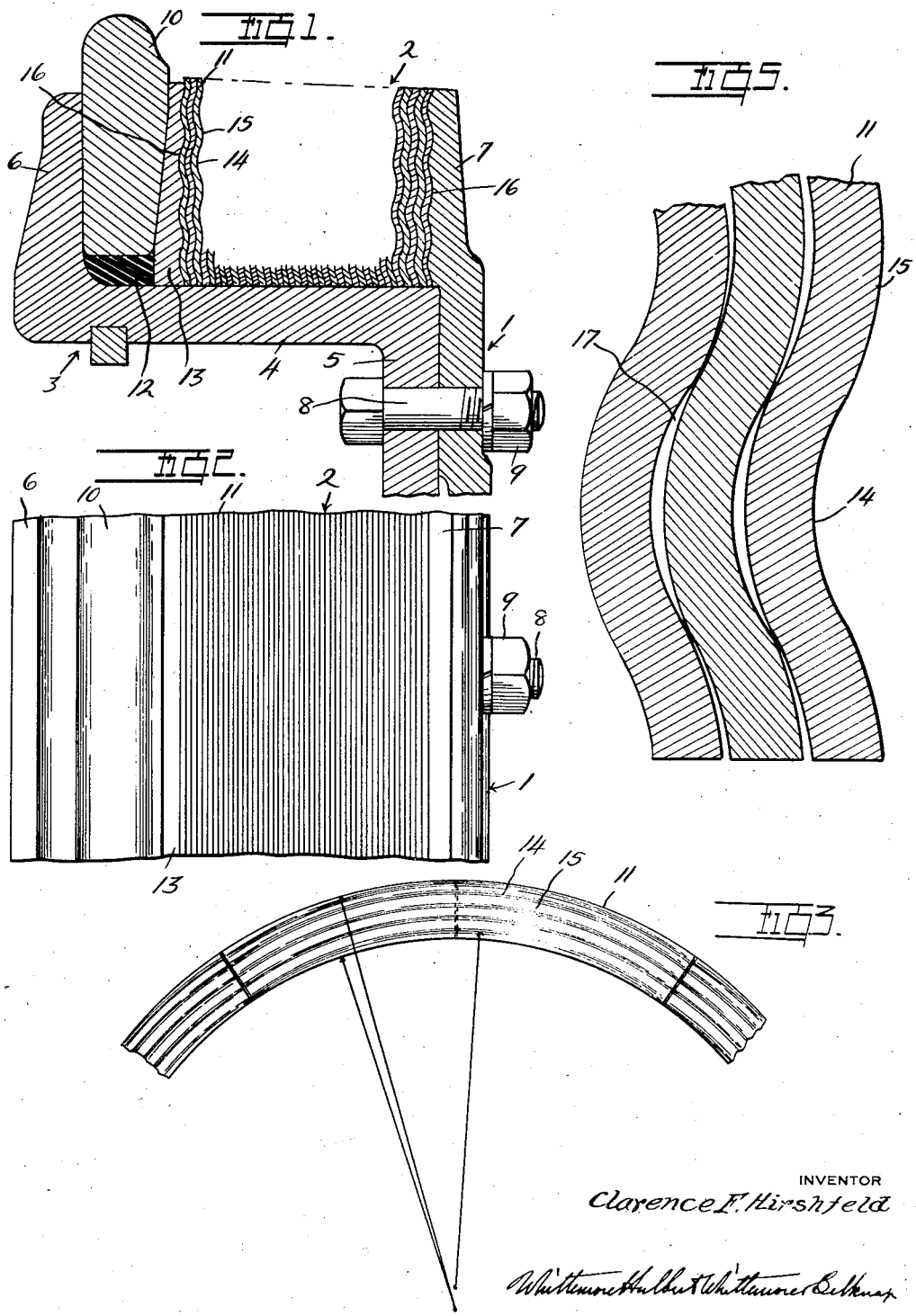
INVENTOR
Clarence F. Hirshfeld
ATTORNEYS Aug. 6, 1935.　　C. F. HIRSHFELD　　2,010,668
TIRE FOR RAIL VEHICLES
Filed Sept. 25, 1933　　2 Sheets-Sheet 2
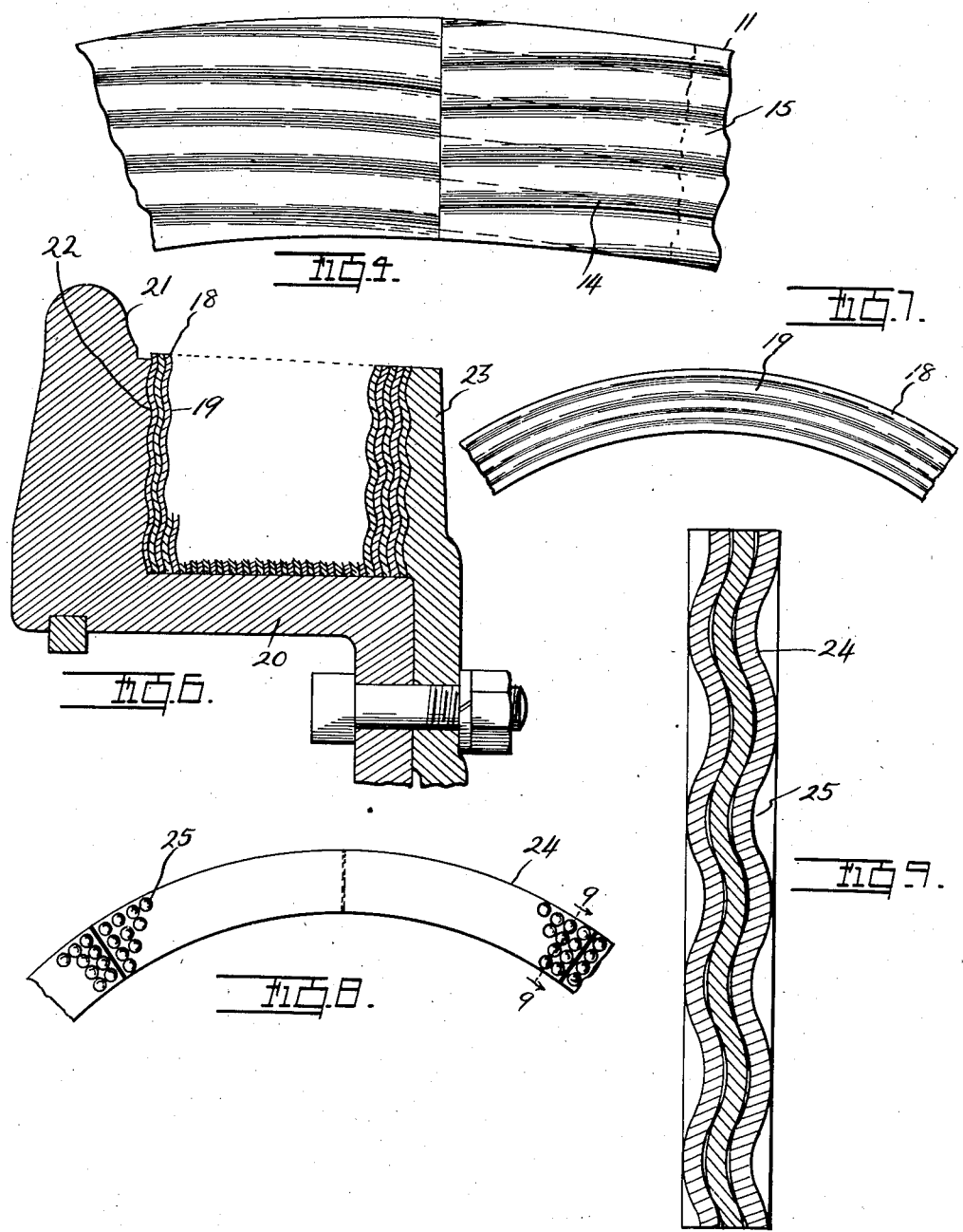
INVENTOR
Clarence F. Hirshfeld
BY
ATTORNEYS Patented Aug. 6, 1935

2,010,668

UNITED STATES PATENT OFFICE 2,010,668

TIRE FOR RAIL VEHICLES

Clarence F. Hirshfeld, Detroit, Mich., assignor to Thomas Conway, Jr., and Charles Gordon, co-trustees for Electric Railway Presidents' Conference Committee Application September 25, 1933, Serial No. 690,910

16 Claims. (Cl. 295—31)

This invention relates to tires for rail vehicles and has for its object to provide a tire having a long life such as can be expected only from a metallic tread, but which will have characteristics of quiet operation and an amount of resiliency such as is expected from a non-metallic tread.

Numerous suggestions have been made to provide a non-metallic tread surface for rail wheels, however, to date no material has been found which will satisfactorily withstand such severe service for a sufficiently long time to be accepted as practical. On the other hand, I am not aware of any metallic tire in prior art which is capable of absorbing vibrations of high frequency in such manner as to deserve being classified as silent or substantially silent. In order to carry out the requirements of the above mentioned object, it is therefore a specific object to provide a tire composed of a plurality of thin metallic laminations and to so form these laminations that resiliency will inhere to the assembly thereof in constituting a tire.

In carrying my invention into effect, I employ laminations having irregular surfaces and which, in preferred form, are corrugated. It is a further and specific object to form these surface irregularities in such manner that an imperfect nesting in assembly will be had.

The laminations in preferred form are not toroids but segments of toroids which are assembled by an overlapping of each one with each adjacent one to form a series of completed toroids. However, they may be made completely circular with good results. It is a further object to teach the assembly of these segments in such manner that relative displacement around the periphery of the wheel rim is precluded.

Other objects and advantages, either directly described or indirectly accruing from the favorable relation of parts will become hereinafter more fully apparent as reference is had to the accompanying drawings, wherein my invention is illustrated by way of example and not in a limiting sense, and in which Figure 1 is a sectional view through a wheel showing an embodiment of my invention;

Figure 2 is an edge elevation thereof;

Figure 3 is a side elevation of a portion of the tire;

Figure 4 is an enlarged view of a portion of Figure 3;

Figure 5 is an enlarged sectional view of a portion of Figure 1;

Figure 6 is a view similar to Figure 1 showing another embodiment of my invention;

Figure 7 is a side elevation of one of the laminations of the tire;

Figure 8 is a view similar to Figure 3 showing another embodiment of my invention;

Figure 9 is a cross section on the line 9—9 of Figure 8.

Referring to Figures 1 to 5 inclusive, 1 is the wheel of the rail vehicle, such as a street car, 2 is the tire of the wheel and 3 is the rim member of the wheel for receiving the tire. The rim member comprises the cylindrical portion 4 which is integral with the radially inwardly extending plate 5 of the wheel and the radially outwardly extending annular flange or plate 6. 7 is the clamping ring or plate for securing the tire under compression upon the rim member. In the present instance, this ring is secured in place by means of the bolts 8 and the nuts 9 which secure the ring to the plate 5.

The tire comprises the annular rail contacting metallic flange member or plate 10 and the plurality of thin metallic laminations 11, the latter providing the tread surface for the wheel. The flange member 10 resides adjacent and, as shown, has a rubbing contact with the flange 6 and it rests at its inner circumference on the non-metallic cushioning element 12 which encircles the cylindrical portion 4 axially beyond and inwardly of the laminations. The cushioning element is preferably formed of rubber. The laminations encircle and rest at their inner circumferences on the cylindrical portion 4. The laminations also have similar non-planar or irregular surfaces or deformations and are resilient and these laminations are assembled in side by side relation with the irregular surfaces or deformations of each nesting with the irregular surfaces or deformations in the adjacent laminations. However, the irregular surfaces or deformations are so formed that they imperfectly nest. 13 is an annular plate member which encircles and rests at its inner circumference on the cylindrical portion 4. This plate member is located between the assembly of laminations 11 and the rail contacting flange member 10 and cushioning element 12 and its surface which rubs on the flange member is inclined to the plane of rotation of the wheel to correspond to the adjacent undercut surface of the flange member. The outer diameter of the plate member 13 is preferably less than the outer diameter of the laminations 11. The surfaces of both the plate members 7 and 13 which contact with the laminations are formed in generally the same manner as the corresponding portions of the laminations so that they also imperfectly nest with the irregular surfaces or deformations of the laminations.

More specifically, the laminations 11 are each in the nature of an annular series of like segments 14 of the toroid, as shown more particularly in Figure 3. The segments of each toroid overlap the segments of the adjacent toroids so that the ends of the segments throughout the assembly are in staggered relation. Each segment is of the same thickness throughout and has its inner and outer circumferences concentric with the cylindrical rim portion 4. Each segment also has the longitudinally extending corrugations 15 which are curved in a longitudinal direction and have their centers spaced from the center of the cylindrical portion. The centers of the longitudinal arcuatenesses of the corrugations coincide and are spaced outwardly from the center of the cylindrical portion on the radial line extending through the middle of each segment, this arrangement being shown exaggerated in Figure 3. It will thus be seen that the adjacent overlapping segments have their corrugations on different centers so that these segments are held from relative circumferential movement by reason of the corrugations of one contacting with the side walls of the corrugations of an adjacent segment, as shown in Figure 4.

The plate members 7 and 13 have their surfaces which contact with the segments formed with the longitudinally extending corrugations 16 which are curved in a longitudinal direction and are concentric with the cylindrical rim portion 4. These plate members hold the laminations under compression and also assist in holding under compression the cushioning element 12.

With this construction of rim, a multiplicity of air gaps 17, as shown more particularly in Figure 5, is left between the corrugations of the adjacent segments of the assembly of laminations held under compression between the plate members. There are also air gaps between the corrugations of the plate members 7 and 13 and the segments in contact with these plate members. As a result, the segments are allowed to flex and the rim has the desired amount of resiliency and is capable of absorbing vibrations of high frequency, so that it is quiet in operation.

As shown in Figures 6 and 7, each lamination 18 is a thin metallic annulus having the longitudinally extending corrugations 19. These corrugations are curved in a longitudinal direction and are concentric with the rim member 20 of the wheel. The annular rail contacting flange member or plate 21 is integral with the rim member and its surface which contacts with the adjacent lamination is formed with the longitudinally extending corrugations 22 which are concentric with the rim member. The clamping ring or plate 23 for securing the tire under compression upon the rim member is formed in the same manner as the clamping ring or plate 7. Due to the fact that the laminations have a definite thickness, the radius of curvature of the corrugations differ for opposite sides. Air gaps are therefore formed between the adjacent laminations and the rail contacting flange member or plate and the tire clamping ring or plate.

Figures 8 and 9 illustrate another embodiment of my invention in which the laminations 24 and the rings or plates for holding these laminations under compression are formed with the small depressions 25 instead of being corrugated. The rings or plates may be similar to the rings or plates 7 and 13, shown in Figure 1, or the rings or plates 23 and 21, shown in Figure 6. These depressions are so formed that they imperfectly nest, thereby providing the air gaps. Any one of a number of such designs is suitable.

What I claim as my invention is:

1. A tire for rail vehicles comprising a plurality of metallic laminations each having deformations along the surfaces thereof, said laminations being adapted for assembly in side by side relation with the deformations of each imperfectly nesting with similar deformations in adjacent laminations, and means for maintaining said laminations in compressed assembly.

2. A wheel tire comprising a plurality of circumferentially extending metallic laminations, each of said laminations being corrugated to nest with adjacent laminations, and means for maintaining said laminations in compressed assembly.

3. A wheel tire comprising a plurality of metallic laminations, each of said laminations being corrugated to nest with adjacent laminations, the corrugations of adjacent laminations being formed for imperfect fitting with respect to adjacent laminations, and means for maintaining said laminations in compressed assembly.

4. A wheel tire comprising a plurality of metallic laminations, each of said laminations having the shape of a segment of a toroid, the ends of each of said laminations overlapping each adjacent lamination in forming a series of complete toroids, and means for maintaining said laminations in compressed assembly.

5. A wheel tire comprising a plurality of metallic laminations, each of said laminations having the shape of a segment of a toroid with the center of the wheel being the center of said toroid, each of said laminations having nonplanar surfaces similar to the surfaces of the other laminations, said laminations being arranged to overlap adjacent laminations in forming a series of complete toroids, and means for maintaining all of said laminations in compressed assembly.

6. A wheel tire comprising a plurality of metallic laminations, each having the shape of the segment of a toroid with the center of the wheel as the center of the toroid, each of said laminations having corrugations for nesting with similar corrugations in adjacent laminations, said corrugations being formed for slight misfitting with adjacent corrugations whereby an air gap remains therebetween even after a substantial application of pressure thereon, said laminations being arranged to overlap adjacent laminations in forming a series of complete toroids, and means for maintaining all of said laminations in compressed assembly.

7. A wheel tire comprising a plurality of circumferentially extending metallic laminations, each of said laminations being corrugated to nest with adjacent laminations, said corrugations each being of arcuate formation in its longitudinal direction.

8. A wheel tire comprising a plurality of metallic laminations, each of said laminations being corrugated to nest with adjacent laminations, said corrugations each being of arcuate longitudinal formation, said corrugations each having a center for its said longitudinal formation spaced from the center of the wheel.

9. A wheel tire comprising a plurality of metallic laminations, each of said laminations having the shape of the segment of a toroid, each of said segments being corrugated to nest with adjacent laminations, each of the corrugations being arcuate in a longitudinal direction, said laminations being arranged to overlap adjacent laminations in forming a series of complete toroids, the corrugations of each lamination having a different center for its longitudinal arcuateness from the other of said laminations with which it overlaps in forming a toroid.

10. In combination with a wheel, a rim portion, a plurality of thin metallic laminations each having surface deformations between the edges thereof to nest with similar deformations in adjacent laminations when assembled, said deformations each forming an imperfect surface contact with the deformations of adjacent laminations, and means for maintaining said laminations in compressed assembly on said rim portion to constitute a tire.

11. In combination with a wheel, a rim portion, a plurality of corrugated laminations each substantially normal to said rim portion, each of said laminations having a curved inner edge adjacent said rim portion and having the same center therewith, the corrugations of each of said laminations being curved in a longitudinal direction and having their centers spaced from the center of said rim portion, and means for securing said laminations on said rim portion.

12. In combination with a wheel, a rim portion, a plurality of corrugated laminations each substantially normal to said rim portion, each of said laminations having a curved inner edge contacting said rim portion and having the same center therewith, the corrugations of each of said laminations being curved in a longitudinal direction and having the centers of their longitudinal arcuateness at variance with the center of said rim portion, and plate members for retaining said laminations in compressed nested assembly on said rim portion, said plate members each being corrugated on the side which contacts said laminations.

13. In combination with a wheel, a rim member, a tire on said rim member comprising a plurality of metallic laminations in side by side assembly, said laminations each being inherently springy and adapted for relative radial rubbing movement directly against each adjacent lamination, and a rail contacting flange member relatively movable with respect to said laminations and said rim member.

14. In combination with a wheel, a rim member, a plurality of thin metallic laminations each substantially normal to the outer surface of said rim member, two plate members for retaining said laminations in compressed assembly, a non-metallic cushioning element encircling said rim portion inwardly of said laminations and residing adjacent one of said plate members, and a rail contacting flange member encircling said rim portion and at its inner circumference resting on said cushioning element, and a spacer ring having one smooth surface for rubbing contact with said flange member and its opposite surface in contact with the innermost laminations.

15. In combination with a wheel, a rim member, a plurality of thin corrugated metallic laminations each substantially normal to the periphery of said rim member, said laminations each being a segment of a toroid, the corrugations of each of said segments being curved in a longitudinal direction, each of said corrugations being formed as a slight misfit for surface nesting with adjacent laminations whereby a multiplicity of air gaps is left therebetween even after compressed assembly, said laminations being arranged to overlap each other in forming a series of complete toroids about said rim portion, a retaining plate on each side of the assembly of laminations, each of said plates having corrugations curved in a longitudinal direction on the side thereof contacting said laminations, a rubber ring encircling said rim portion inwardly of said laminations and residing immediately adjacent one of said plate members, and a rail contacting flange member encircling said rubber ring and at its inner circumference resting thereon, said flange member at its side having rubbing contact with its adjacent plate member.

16. In combination with a wheel, a rim member, a plurality of thin corrugated metallic laminations each substantially normal to the periphery of said rim member, said laminations each being the segment of a toroid, the corrugations of each of said segments being curved in a longitudinal direction, said corrugations having a center for this longitudinal curvature offset from the center of said rim members, said laminations being arranged to progressively overlap adjacent laminations in forming a series of complete toroids, and retaining plates on said rim member for maintaining said laminations in compressed assembly, said plate members having corrugations formed in the surfaces adjacent said laminations, the corrugations of said plate members being curved in a longitudinal direction with the center of said rim member as the center of such longitudinal curvature.

CLARENCE F. HIRSHFELD.